(12) United States Patent
Tieu et al.

(10) Patent No.: US 10,496,863 B2
(45) Date of Patent: *Dec. 3, 2019

(54) SYSTEMS AND METHODS FOR IMAGE ALIGNMENT

(71) Applicant: Synaptics Incorporated, San Jose, CA (US)

(72) Inventors: Kinh Tieu, Sunnyvale, CA (US); Anthony Russo, New York, NY (US); Bob Mackey, San Jose, CA (US); Kuntal Sengupta, Cupertino, CA (US)

(73) Assignee: Synaptics Incorporated, San Jose, CA (US)

(*) Notice: Subject to any disclaimer, the term of this patent is extended or adjusted under 35 U.S.C. 154(b) by 221 days.

This patent is subject to a terminal disclaimer.

(21) Appl. No.: 15/728,392

(22) Filed: Oct. 9, 2017

(65) Prior Publication Data
US 2018/0032786 A1 Feb. 1, 2018

Related U.S. Application Data

(63) Continuation of application No. 14/755,897, filed on Jun. 30, 2015, now Pat. No. 9,785,818.

(60) Provisional application No. 62/036,031, filed on Aug. 11, 2014.

(51) Int. Cl.
G06K 9/00 (2006.01)
G06K 9/36 (2006.01)
G06T 7/33 (2017.01)
G06T 3/00 (2006.01)

(52) U.S. Cl.
CPC ........ G06K 9/00013 (2013.01); G06T 3/0068 (2013.01); G06T 7/337 (2017.01)

(58) Field of Classification Search
None
See application file for complete search history.

(56) References Cited

U.S. PATENT DOCUMENTS

2014/0331059 A1* 11/2014 Rane ................. G06K 9/00093
713/186
2016/0147987 A1* 5/2016 Jang ..................... G06F 21/32
726/19

OTHER PUBLICATIONS

Singh et al., Enhanced Rotational Invariant Fingerprint Matching Algorithm based on Minutiae, International Journal of Computer Applications (0975-8887) vol. 82—No. 10, Nov. 2013 (Year: 2013).*

(Continued)

Primary Examiner — Randolph I Chu
(74) Attorney, Agent, or Firm — Leydig, Voit & Mayer, Ltd.

(57) ABSTRACT

Systems and methods for image alignment are disclosed. A method includes: determining a first set of patches for a first image and a second set of patches for a second image, wherein each patch in the first and second sets of patches comprises a portion of the first and second image, respectively; determining a set of possible match pairings of a patch from the first set and a patch from the second set; for each match pairing in the set of possible match pairings, computing a transformation operation to align the patch from the first set of patches and the patch from the second set of patches in the match pairing; grouping the match pairings into clusters based on parameters of the transformation operations of the match pairings; and, performing the transformation operation corresponding to at least one cluster to align the first image to the second image.

20 Claims, 6 Drawing Sheets

(56) References Cited

OTHER PUBLICATIONS

Yang et al., Fingerprint Verification Based on Invariant Moment Features and Nonlinear BPNN, International Journal of Control, Automation, and Systems, vol. 6, No. 6, pp. 800-808, Dec. 2008 (Year: 2008).*

Mandi et al., Rotation—Invariant Fingerprint Identification System, International Journal of Electronics Communication and Computer Technology (IJECCT) vol. 2 Issue 4 (Jul. 2012) (Year: 2012).*

* cited by examiner

602  FIG. 6A

SYSTEMS AND METHODS FOR IMAGE ALIGNMENT

CROSS-REFERENCE TO RELATED APPLICATION(S)

This patent application in a continuation of U.S. non-provisional application Ser. No. 14/755,897, filed on Jun. 30, 2015, which claims the benefit of U.S. provisional application No. 62/036,031, filed on Aug. 11, 2014, both of which are hereby incorporated by reference in their entirety.

FIELD

This disclosure relates generally to the field of image processing and, more specifically, to systems and methods for biometric image alignment.

BACKGROUND

Since its inception, biometric sensing technology, such as fingerprint sensing, has revolutionized identification and authentication processes. The ability to capture and store biometric data in a digital file of minimal size has yielded immense benefits in fields such as law enforcement, forensics, and information security.

Utilizing fingerprints in a biometric authentication process typically includes storing one or more fingerprint images captured by a fingerprint sensor as a fingerprint template for later authentication. During the authentication process, a newly acquired fingerprint image is received and compared to the fingerprint template to determine whether there is a match. Before the newly acquired fingerprint image can be compared to the fingerprint template, the newly acquired fingerprint image is aligned by performing a transformation to the newly acquired fingerprint image. The transformation may include one or more of rotation, translation (in two dimensions), and scaling of the newly acquired fingerprint image. This process is known as image alignment.

However, image alignment is a challenging problem when the newly acquired fingerprint image and the template image are low quality or if only a small part of one image overlaps with a sub-part of the other image. With increased use of smaller image sensors, the amount of overlap among the images is decreasing, which further decreases the effectiveness of conventional image alignment techniques. In addition, if a purely minutiae-based technique is used for image alignment or image matching, the use of smaller sensors decreases the number of minutiae points in the images, which decreases even further the effectiveness of conventional image alignment and image matching techniques.

Accordingly, there remains a need in the art for systems and methods for image alignment that address the deficiencies of conventional approaches.

SUMMARY

One embodiment of the disclosure provides a processing system, including a processor and a memory storing instructions that, when executed by the processor, cause the processing system to compute a transformation operation that aligns a first image to a second image. Aligning the first image to the second image includes: determining a first set of patches for the first image, wherein each of the patches in the first set of patches comprises a portion of the first image; determining a second set of patches for the second image, wherein each of the patches in the second set of patches comprises a portion of the second image; for each of the patches in the first and second sets of patches, computing a value of an attribute of the patch, wherein the attribute is invariant to the transformation operation; discarding one or more patch pairings including a patch from the first set of patches and a patch from the second set of patches in response to determining that the rotation-invariant attributes do not match for the patch pairing; for one or more patch pairings that are not discarded, identifying a similarity value between the patch from the first set of patches and the patch from the second set of patches in the patch pairing; selecting a set of candidate pairings based on identifying the patch pairings having a similarity value that satisfies a threshold; for each candidate pairing in the set of candidate pairings, determining a transformation operation to align the patch from the first set of patches and the patch from the second set of patches in the candidate pairing; grouping the candidate pairings into clusters based on parameters of the transformation operations of the candidate pairings; and performing the transformation operation corresponding to at least one of the clusters to align the first image to the second image.

Another embodiment of the disclosure provides a method, comprising: determining a first set of patches for a first image, wherein each patch in the first set of patches comprises a portion of the first image; determining a second set of patches for a second image, wherein each patch in the second set of patches comprises a portion of the second image; determining a set of possible match pairings of a patch from the first set of patches and a patch from the second set of patches; for each match pairing in the set of possible match pairings, computing a transformation operation to align the patch from the first set of patches and the patch from the second set of patches in the match pairing; grouping the match pairings into clusters based on parameters of the transformation operations of the match pairings; and, performing the transformation operation corresponding to at least one cluster to align the first image to the second image.

Yet another embodiment of the disclosure provides an electronic device, comprising: a fingerprint sensor configured to capture a first image of a fingerprint; a memory storing a second image of a fingerprint; and a processor. The processor is configured to perform the steps of: determining a first set of patches for a first image, wherein each patch in the first set of patches comprises a portion of the first image; determining a second set of patches for a second image, wherein each patch in the second set of patches comprises a portion of the second image; determining a set of possible match pairings of a patch from the first set of patches and a patch from the second set of patches; for each match pairing in the set of possible match pairings, computing a transformation operation to align the patch from the first set of patches and the patch from the second set of patches in the match pairing; grouping the match pairings into clusters based on parameters of the transformation operations of the match pairings; performing the transformation operation corresponding to at least one cluster to align the first image to the second image; and determining whether the aligned first image is a fingerprint match to the second image.

BRIEF DESCRIPTION OF THE DRAWINGS

FIGS. 6A-6B are examples of skeletonized fingerprint images with circular patches shown thereon, according to some example embodiments.

DETAILED DESCRIPTION

Figure 1:
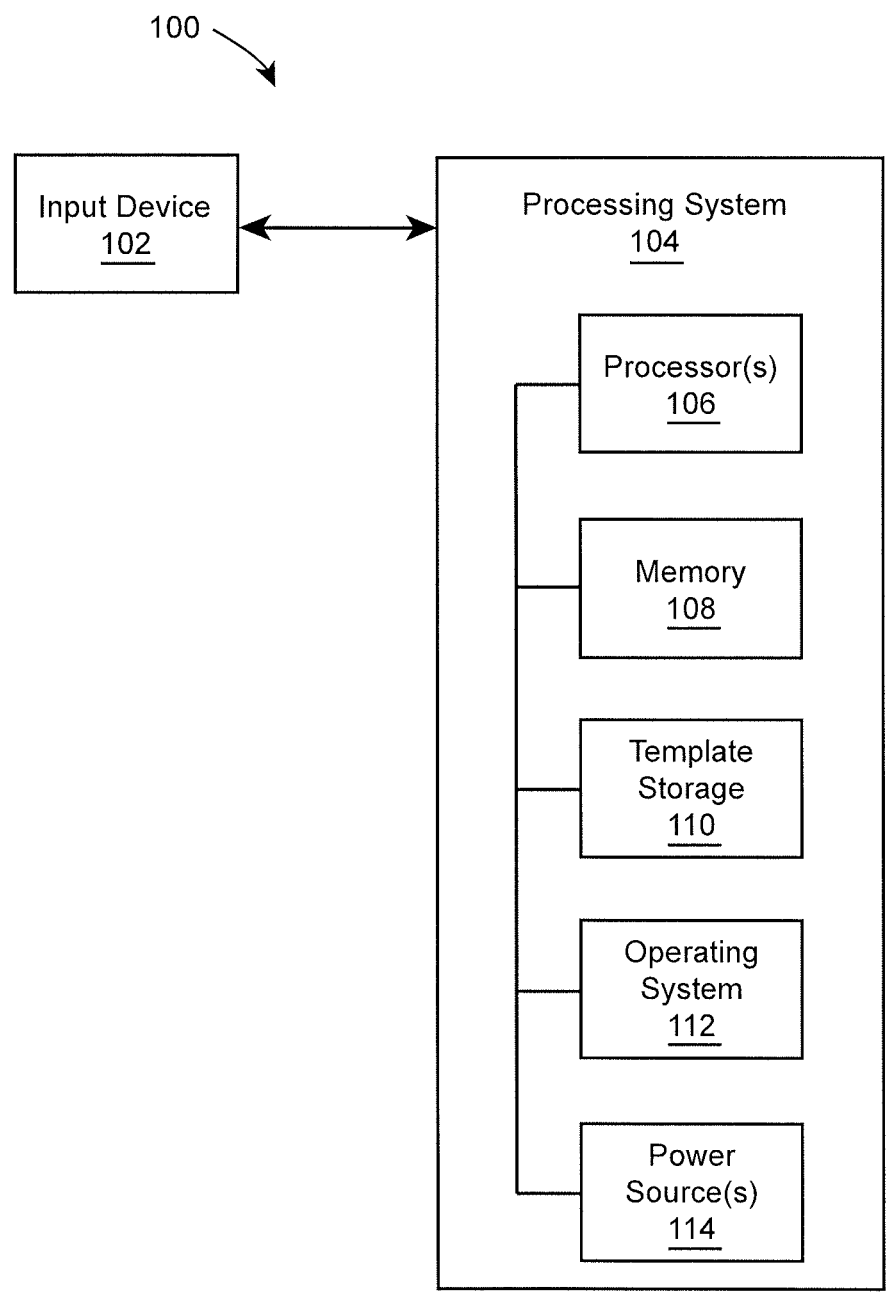
FIG. 1 is a block diagram of an example electronic system that includes an input device and a processing system, according to an embodiment of the disclosure.

Some embodiments of the disclosure address the problem of image alignment for images having significant oriented texture or edges. Fingerprint images are examples of such images; however, iris images, vein patterns, and aerial views of a city are other examples. As described, image alignment is a challenging problem when images are low quality or if only a small part of one image overlaps with a sub-part of another image, as is common when the images are captured using very small sensors.

In conventional approaches to fingerprint matching, minutiae points are detected in the images. The locations and corresponding orientations of the minutia points form the features of interest for each image being compared. The sets of minutia from the two images are aligned to one another using a voting procedure in Hough space based on each possible point-to-point correspondence between the two minutia sets, and the minutia points in the aligned minutia sets are compared to each other to determine whether they are a match. Unfortunately, these conventional fingerprint matching techniques rely on large numbers of minutia points to be present in the images, both for the alignment stage, as well as for the matching stage where the aligned images are compared to determine whether they were derived from the same user fingerprint. The use of smaller sensors decreases the number of minutiae points in the images, which decreases the effectiveness of these conventional image alignment and image matching techniques.

Embodiments of the disclosure provide image alignment techniques that can operate on small images with few or even no minutiae points in the overlap area of the two images. In some embodiments, each image is divided into small regions, also referred to herein as "patches." Certain features are computed for each patch in the two images. Some examples of features that may be computed for each patch include: (a) a number of edge points in the patch, (b) a rotation-invariant moment of the patch, such as the Hu moment, (c) an average curvature of the edges in the patch, (d) a dominant orientation of the edges in the patch, if any, (e) an edge pixel density for the patch, (f) an edge map for the patch, or (g) a distance map computed from the edge map for the patch.

Suppose one wishes to align a first image and a second image. Now suppose that the first image is divided into N patches and the second image is divided into M patches. Each patch may be a circular region taken from the given image. The patches may overlap one another within a given image. In this example, there is a total of N×M patch match hypotheses for matching the first image to the second image.

The patch match hypotheses can then be evaluated to select a set of possible match pairings. This may be based on similarity between features of the patches from the different images. A large number of these patch match hypotheses can be discarded quickly by comparing one or more of the attributes computed for the patches. The attributes used to quickly discard pairings of the patches may be invariant to the transformation being computed to align the patches (e.g., invariant to translation, rotation, or scaling). For example, if a rotational transformation is being computed to align the images, rotation invariant attributes such as the number of edge points and the rotation-invariant Hu moments can be used to discard a patch pairing as a possible patch match; if a scale factor is being computed, scale invariant attributes such as the edge pixel density can be used to discard a patch pairing as a possible patch match. If the attributes, such as the number of edge points and the rotation-invariant Hu moments, do not match for a given pairing of patches (e.g., one patch from each image in the pairing of patches), that particular pairing of patches can be discarded as a possible patch match.

For each of X pairings of patches that remain following culling of some of the patch match hypotheses, a transformation is computed that aligns the patch in the pairing from the first image to the patch in pairing from the second image. The transformation may include an x-translation, a y-translation, and a rotation. In some implementations, the transformation may further include a scale factor.

In some embodiments, the X transformations corresponding to the X pairings of patches are clustered into K clusters according to similarities between the transformations. The transformations corresponding to the top clusters may be selected as possible transformations that align the first image to the second image. The transformations corresponding to these top clusters may then be tested on the images as transformation hypotheses to attempt to align the images. If after applying one of the transformations to the first image results in a match to the second image, then a positive match is identified between the first and second image. If however none of the transformations corresponding to the top clusters results in a match, it may be determined that the first image does not match the second image.

FIG. 1 is a block diagram of an example electronic system 100 that includes an input device 102 and a processing system 104, according to an embodiment of the disclosure. The basic functional components of the electronic device 100 utilized during capturing, storing, and validating a biometric authentication attempt are illustrated. The processing system 104 includes a processor(s) 106, a memory 108, a template storage 110, an operating system (OS) 112, and a power source(s) 114. Each of the processor(s) 106, the memory 108, the template storage 110, the operating system 112 and power source 114 are interconnected physically, communicatively, and/or operatively for inter-component communications.

As illustrated, processor(s) 106 are configured to implement functionality and/or process instructions for execution within electronic device 100 and the processing system 104. For example, processor 106 executes instructions stored in memory 108 or instructions stored on template storage 110 to determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110. According to various embodiments, the processor(s) 106 implement hardware and/or software to align two images and compare the aligned images to one another to determine whether there is a match, as described in greater detail below.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material.

Input device 102 can be implemented as a physical part of the electronic system 100, or can be physically separate from the electronic system 100. As appropriate, the input device 102 may communicate with parts of the electronic system 100 using any one or more of the following: buses, networks, and other wired or wireless interconnections. In some embodiments, input device 102 is implemented as a fingerprint sensor and utilizes one or more various electronic fingerprint sensing methods, techniques, and devices to capture a fingerprint image of a user. Input device 102 may utilize any type of technology to capture a biometric corresponding to a user. For example, in certain embodiments, the input device 102 may be an optical, capacitive, thermal, pressure, radio frequency (RF) or ultrasonic sensor.

Some non-limiting examples of electronic systems 100 include personal computers of all sizes and shapes, such as desktop computers, laptop computers, netbook computers, tablets, web browsers, e-book readers, and personal digital assistants (PDAs). Additional example electronic systems 100 include composite input devices, such as physical keyboards and separate joysticks or key switches. Further example electronic systems 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

As described in greater detail herein, embodiments of the disclosure provide systems and methods to match a newly acquired image with a template image, such as in the context of fingerprint matching. As part of the image matching process, the newly acquired image is first aligned to the template image.

Figure 2A:
FIG. 2A illustrates a grayscale fingerprint image that shows various ridges and minutiae of a fingerprint, according to one embodiment.
Figure 2B:
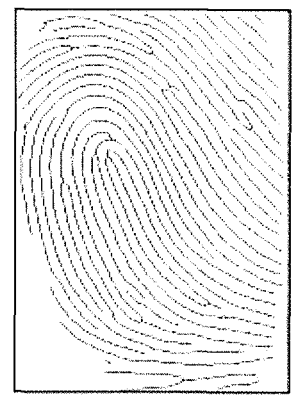
FIG. 2B illustrates a skeletonized version of the grayscale fingerprint image in FIG. 2A, according to one embodiment.

FIG. 2A illustrates a grayscale fingerprint image that shows various ridges and minutiae of a fingerprint, according to one embodiment. As can be seen in FIG. 2A, the image is noisy such that portions of the image are cloudy and the ridges or contours are broken. FIG. 2B illustrates a skeletonized version of the grayscale fingerprint image in FIG. 2A, according to one embodiment. Fingerprint skeletonization, also referred to as thinning, is the process of converting the ridge lines in a grayscale fingerprint image (see, for example, the image in FIG. 2A) to a binary representation, and reducing the width of binarized ridge lines to one pixel wide. As can be seen in FIG. 2B, the skeletonized version of the grayscale fingerprint image removes much of the noise so that the image is no longer cloudy and the ridge lines are no longer broken.

Figure 3A:
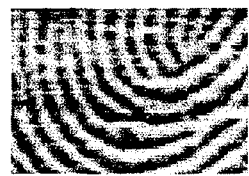
FIG. 3A illustrates a small grayscale fingerprint image that shows various ridges and minutiae of a fingerprint, according to one embodiment.
Figure 3B:
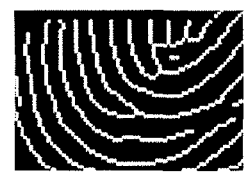
FIG. 3B illustrates a skeletonized version of the grayscale fingerprint image in FIG. 3A, according to one embodiment.

FIG. 3A illustrates a small grayscale fingerprint image that shows various ridges and minutiae of a fingerprint, according to one embodiment. As can be seen in FIG. 3A, the image is noisy such that portions of the image are cloudy and the ridges or contours are broken. Also, the image in FIG. 3A is much smaller than the image shown in FIG. 2A. This may be a result of, for example, using a smaller sensor to capture the image in FIG. 3A. FIG. 3B illustrates a skeletonized version of the grayscale fingerprint image in FIG. 3A, according to one embodiment.

Figure 4:
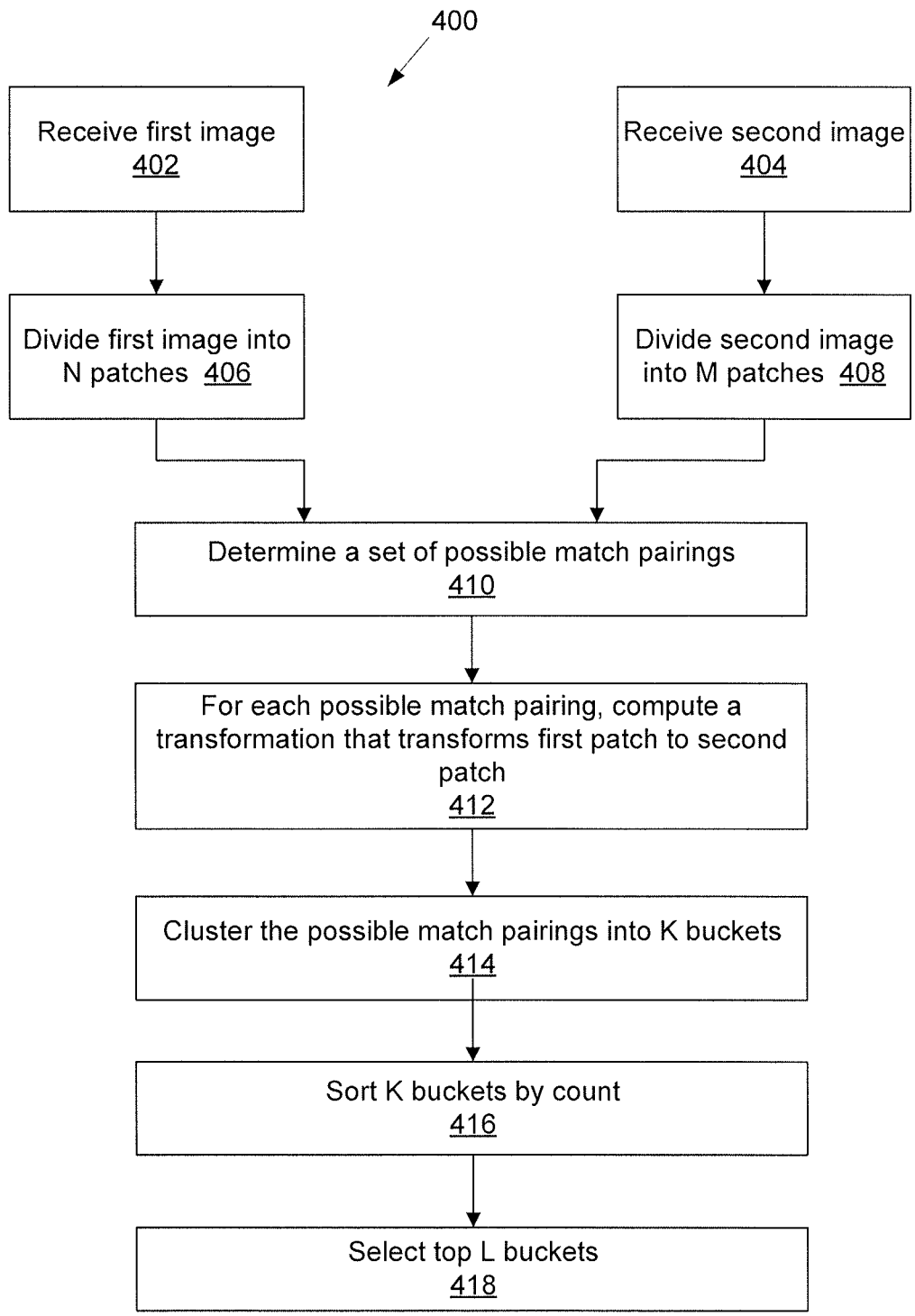
FIG. 4 is a flow diagram of method steps for aligning two images, according to one embodiment of the disclosure.

FIG. 4 is a flow diagram of a method 400 for aligning two images, according to one embodiment of the disclosure. At step 402, a processing system receives a first image. At step 404, the processing system receives a second image. In some embodiments, the first image is a newly acquired image captured by an image sensor, and the second image is a template image that was previously acquired to which the first image is to be compared to determine whether there is a match.

In some embodiments, each of the first and second images are skeletonized images. As such, appropriate pre-processing (not shown) may be performed to convert a grayscale image, such as a fingerprint image, to a skeletonized image (also sometimes referred to herein as an "edge map," "edge image," or "thinned ridge image," depending on the context). In some embodiments, converting the second image (i.e., template image) to a skeletonized format is pre-computed by the processing system once and does not need to be recomputed each time that a newly acquired image is presented to compare to the second image.

At step 406, the processing system divides the first image into N patches. As described, each patch may be a circular region of the first image. The patches in the first image may overlap one another. At step 408, the processing system divides the second image into M patches. As described, each patch may be a circular region of the second image. The patches in the second image may overlap one another. In some embodiments, N=M. In other embodiments, N and M are not equal, such as when the first and second images are of different sizes.

Although steps 402 and 406 are shown to be performed in parallel with steps 404 and 408, in other embodiments, steps 402, 404, 406, 408 can be performed serially or in any technically feasible order.

Figure 6B:
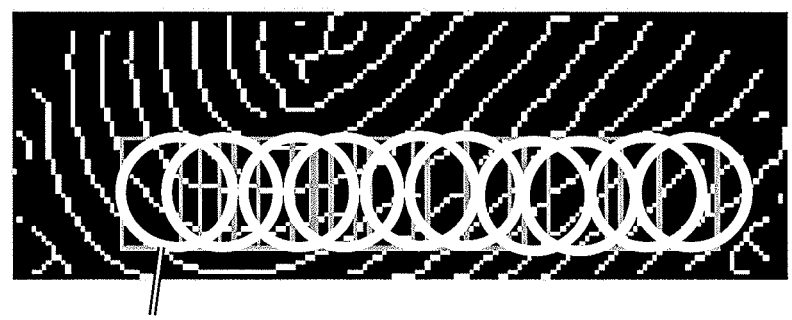
Figure 6B:
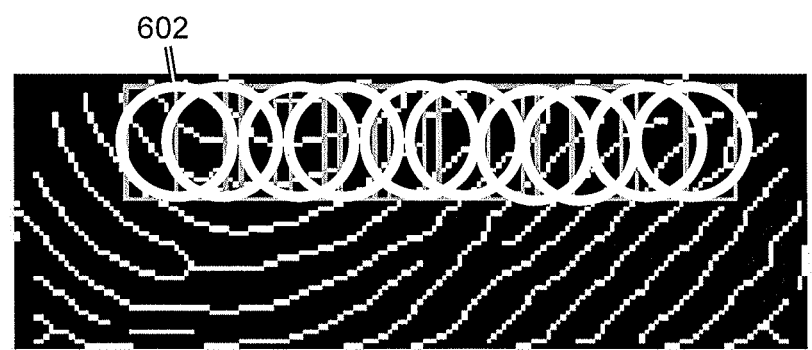

FIGS. 6A-6B are examples of skeletonized fingerprint images with circular patches 602 shown thereon, according to some example embodiments. In one example, the image in FIG. 6A corresponds to the first image and the image in FIG. 6B corresponds to the second image. According to some embodiments, the entirety of the images are covered in patches. In FIGS. 6A-6B, however, only a portion of the patches are shown for clarity.

Referring back to FIG. 4, at step 410, the processing system determines a set of possible match pairings between patches in a first image and patches in a second image. An example embodiment for performing step 410 is shown in FIG. 5 with additional detail.

Figure 5:
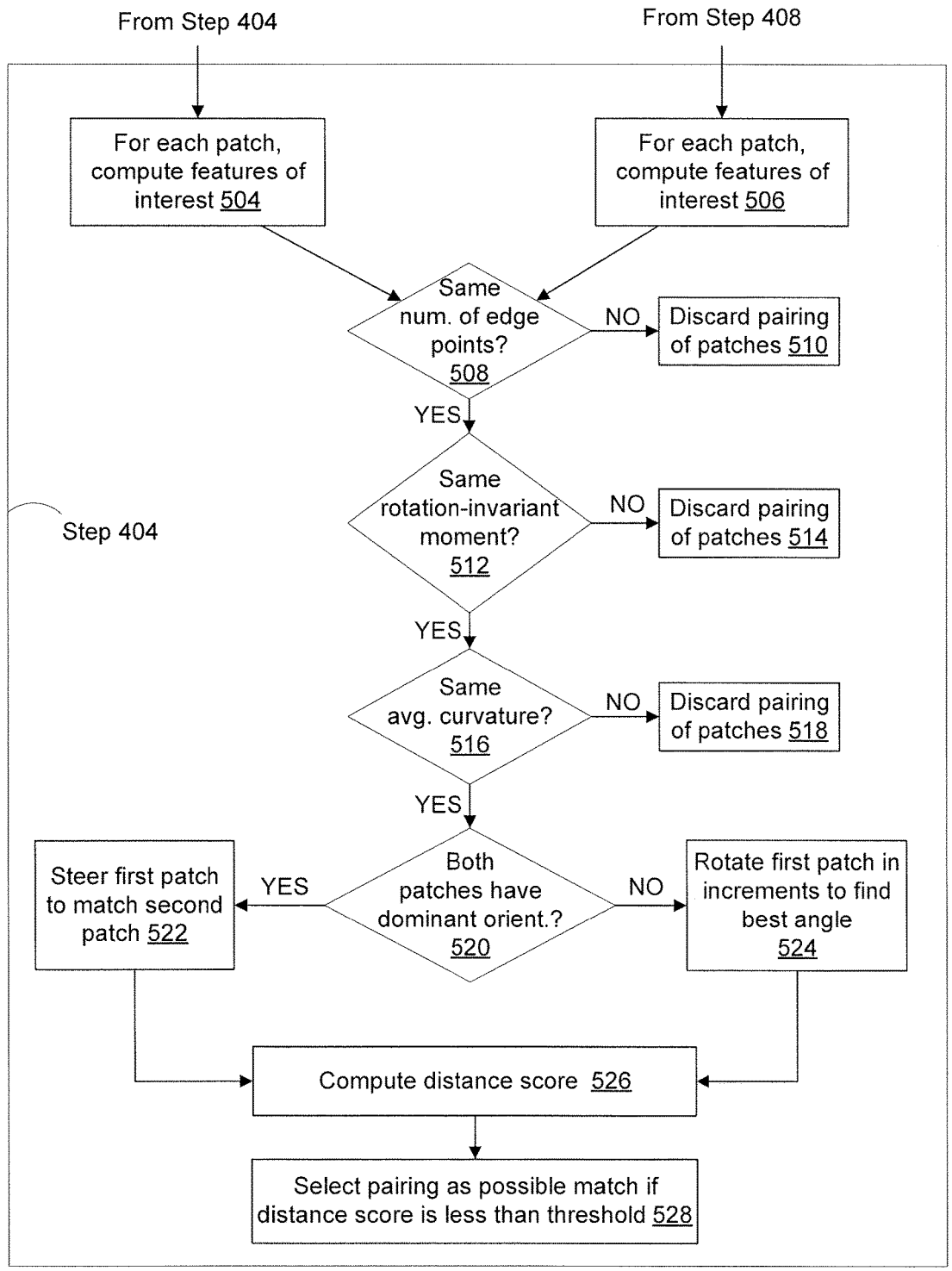
FIG. 5 is a flow diagram of method steps of determines a set of possible match pairings between patches in a first image and patches in a second image, according to one embodiment of the disclosure.

FIG. 5 is a flow diagram of method steps of determines a set of possible match pairings between patches in a first image and patches in a second image, according to one embodiment of the disclosure. At step 504, the processing system receives the N patches corresponding to the first image (see, step 406 in FIG. 4) and computes various properties of each patch, also referred to herein as "features." Some examples of features that are computed for each patch include: (a) a number of edge points in the patch, (b) a rotation-invariant moment of the patch, such as the Hu moment, (c) an average curvature of the edges in the patch, (d) a dominant orientation of the edges in the patch, if any, (e) an edge pixel density for the patch, or (f) an edge map for the patch, or (g) a distance map computed from the edge map for the patch.

At step 506, the processing system receives the M patches corresponding to the second image (see, step 408 in FIG. 4) and computes various properties of each patch, also referred to herein as "features." In one embodiment, the same properties of each patch in the second image are computed as for the first image. In addition, although steps 504 and 506 are shown to be performed in parallel, in other embodiments, steps 504 and 506 can be performed serially or in any technically feasible order. In some embodiments, 504 and 506 are omitted, and each particular property of the patches in the first and second images is computed on-demand during the remaining steps in FIG. 5, as described in greater detail below.

At step 508, the processing system determines, for each pairing of patches ($p_i$, $q_k$) whether the pairing of patches has the same number of edge points, where $p_i$ is one of the N patches in the first image and $q_k$ is one of the M patches in the second image. A pairing of patches may be considered to have the same number of edge points when the ridge pixel counts are within a tolerance threshold.

As shown at step 510, if, for a given pairing of patches, the processing system determines that the pairing of patches does not have the same number of edge points, then the pairing of patches is discarded as possible match pairing.

If a pairing of patches satisfies the criterion at step 508 (i.e., that each patch in the pairing of patches has the same number of edge points within a tolerance), then at step 512, the processing system determines, for each pairing of patches ($p_i$, $q_k$) that passed step 508, whether each patch in the pairing of patches has the same rotation-invariant moment, such as the "Hu" moment. An image moment is a certain particular weighted average of the intensities of the pixels in the image, or a function of such weighted average. A pairing of patches may be considered to have the same rotation-invariant moment when the values are within a tolerance threshold.

As shown at step 514, if, for a given pairing of patches, the processing system determines that the pairing of patches does not have the same rotation-invariant moment, then the pairing of patches is discarded as possible match pairing.

If a pairing of patches satisfies the criterion at step 512 (i.e., that the patches in the pairing of patches have the same rotation-invariant moment), then at step 516, the processing system determines, for each pairing of patches ($p_i$, $q_k$) that passed step 512, whether each patch in the pairing of patches has the same average curvature. If rotation is one of the parameters being computed for the transformation that aligns the two images, then the curvature attribute used at this stage may be computed without regard to directionality. This allows patch pairings to be discarded where a degree of curvature in the two patches differs beyond a tolerance value.

Figure 7:
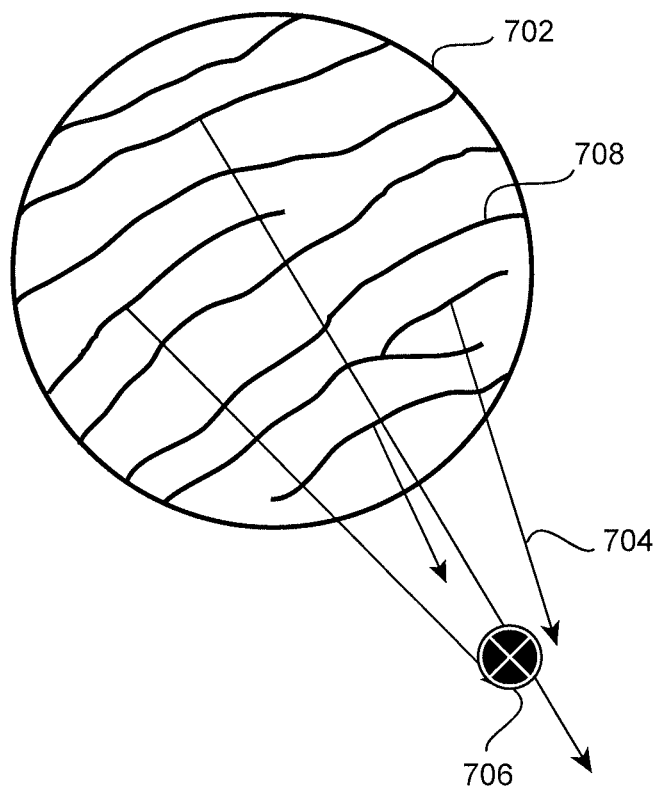
FIG. 7 is a diagram of a patch showing local curvature vectors and an average curvature of the patch, according to one embodiment.

FIG. 7 is a diagram of a patch showing local curvature vectors and an average curvature of the patch, according to one embodiment. As shown in FIG. 7, a circular patch 702 of a fingerprint image includes one or more ridges 708. Each ridge 708 is associated with some curvature. The ridges 708 tend to be very nearly parallel with neighboring ridges locally, but can curve along their length. Within a patch 702, the average curvature or set of curvatures can be used to locate a focus 706. When searching for patches in a second image that match a give patch in a first image, the average curvature, set of curvatures, or focus 706 may be computed for each patch and used to guide the alignment between those patches.

Referring back to FIG. 5, as shown at step 518, if, for a given pairing of patches, the processing system determines that each patch in the pairing of patches does not have the same average curvature, then the pairing of patches is discarded as possible match pairing. The curvature of the patch at this stage may be used as a rotation-invariant attribute for the patch without regard to the directionality of the curvature.

If a pairing of patches satisfies the criterion at step 516 (i.e., that each patch in the pairing of patches has the same average curvature), then remaining pairings of patches can be aligned, and similarity between the patches in the pairings can be evaluated more closely for similarity. At step 520, the processing system determines, for each pairing of patches ($p_i$, $q_k$) that passed step 516, whether each patch in the pairing of patches has a dominant orientation. A given patch may be considered to have a dominant orientation if a certain percentage of the ridges in the patch have approximately the same directionality. If both patches in a given pairing have a dominant orientation (say, $t_1$ and $t_2$, respectively), then at step 522, the processing system steers the first patch in the pairing to match the dominant orientation of the second patch in the pairing. For example, the first patch may be rotated by $t_2-t_1$ degrees. If one or both of the patches in the pairing of patches does not have a dominant orientation, then at step 524, the processing system rotates the first patch in small increments covering the range of possible rotational transformations being searched (e.g., covering 360 degrees) to find the angle that gives the best match to the second patch.

Referring to FIG. 7, in some embodiments, for each ridge 708 in a patch 702, a local radius vector 704 is computed. The directionality of the local radius vector 704 is based on the curvature of the ridge 708, where an end point of the local radius vector 704 is the point that would be the center of a circle crated by extending the ridge 708. The focus 706 of the patch 702 is computed by calculating an average of the end points of the local radius vectors 704. Aligning the dominant direction of the ridges in a pairing of patches gives a first approximation of the angular alignment between the two patches. That alignment allows two possible angles, differing by 180 degrees. Alignment between two patches can be guided by the approximating that they have a similar focus. This may allow two possible angles determined based on dominant direction to be disambiguated based on directionality of the curvature. This also allows steering the translational adjustment of the alignment between two patches. In another embodiment, steering may simply be guided based on the curvature of the patches instead of the dominant orientation.

From steps 522 and 524, the method in FIG. 5 proceeds to step 526, where the processing system computes a similarity score between the rotated first patch and the second patch. In one embodiment, computing the similarity score may comprise computing a chamfer distance between the rotated first patch and the second patch. Calculating a chamfer distance comprises computing a measure of dissimilarity between two images. In general, to compute a chamfer distance, the processing system extracts the edge/contours of a query image as well as the edge/contours of a target image, takes one point/pixel of contour in the query image and finds a distance of a closest point/pixel of contour in target image, and computes a sum the distances for all edge points/pixels of query image. In other embodiments, different similarity metrics may be used to compute the similarity score. For example, different features of the patches, such as the distance map, may be used.

At step 528, the processing system selects the pairings of patches that have a similarity score that satisfies a threshold as the possible match pairings. The patches can be considered to have a similarity score that satisfies a threshold when a matching score between the aligned patches is above a threshold, or when a difference score between the aligned patches is below a threshold. For example, if chamfer distance between edge maps for the patches is used as the similarity metric, the similarity score may be satisfied if the chamfer distance is below a certain threshold.

In some embodiments, it is possible to select two or more patches within an image for computation of the similarity of between pairings of patches at step 526. In these embodiments, instead of a pairing $(p_i, q_k)$ of a single patch in the first image with a single patch in the second image, the pairing involves pairing a set of multiple patches in the first image with a set of multiple patches in the second image, e.g., $(p_i, p_j; q_k, q_h)$. The number of patches in each set may also be associated with the number of transformation parameters being computed to resolve the patch pairing alignment for computation of the similarity score. For example, instead of incrementally steering the patch in the first image, or using the dominant orientation to steer the patch in the first image, multiple patches can be selected from the first image with their geometric relationship to each other preserved. A transformation involving translation, rotation, and scaling of the patches from the first set can be resolved by selecting two patches in the first image and computing the translation and rotation that aligns this to a set of two patches from the second image. Similarly, three or more patches from the first image can be paired with a similar number of patches from the second image to compute a more complex transformation or provide a more accurate result. For example, three patches may be sufficient to resolve a more complex affine transformation.

Also, it should be noted that although certain criteria (i.e., attributes) are used to cull certain patch pairings as possible matches at steps 508, 512, 516, these culling steps can be performed in any other order. In other embodiments, different or additional culling parameters may be utilized to discard certain pairings of patches as possible matches.

Referring back to FIG. 4, as described above, at step 410 the processing system determines the set of possible match pairings. At step 412, the processing system computes, for each possible match pairing, a transformation $T_{ij}$ that transforms the first patch to the second patch. The transformation can be characterized by an x-translation, a y-translation, and a rotation. In some embodiments, a scale factor may also be included as a transformation parameter.

At step 414, the processing system clusters the possible match pairings into K buckets based on the transformation values. If a transformation has values for its x-translation, y-translation, rotation that are within certain thresholds of the x-translation, y-translation, rotation of another transformation, respectively, then those two transformations can be clustered into the same bucket. At step 416, the processing system sorts the K buckets by count. At step 418, the processing system selects the top L buckets as possible buckets for transformations that align the first image to the second image.

Each of the top L buckets is then analyzed to determine whether the bucket corresponds to a transformation that aligns the first image to the second image. For a given bucket, the processing system inspects the patches that are included the bucket. The processing system counts the number of edge points that fall within the patches in which the discs are inscribed. Let the number of edge points that fall within the patches be Y. Next, the processing system counts the number of edge points in the overlap region (between the first image and the second image, as per the transformation hypothesis corresponding to the bucket) that are not covered by the Y patches. Let this number be Z. The patch match score Scan be computed as $S=Y-a \cdot Z$, where "a" is typically a number greater than 1. In other words, the processing system penalizes no edge matches in the overlap region more than it rewards edge matches. The bucket receiving the highest score is chosen for further analysis. The score as defined above serves as the matching score between the two images. The overall transformation between the two images can be computed using the RANSAC algorithm, starting from the patch matches contributing to this cluster. Once the first image is aligned with the second image, the processing system can perform an analysis to determine whether the first image matches the second image, such as whether there is a biometric match, such as a fingerprint match or vein pattern match.

Advantageously, embodiments of the disclosure provide an image alignment technique that can operate on relatively small images, such as those that have no minutiae points in common.

The embodiments and examples set forth herein were presented in order to best explain the present disclosure and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A processing system, comprising:
   a processor; and
   a memory storing instructions that, when executed by the processor, cause the processing system to align a first biometric image to a second biometric image, the processor being configured to:
      determine a first set of patches for the first biometric image, wherein each of the patches in the first set of patches comprises a portion of the first biometric image;
      determine a second set of patches for the second biometric image, wherein each of the patches in the second set of patches comprises a portion of the second biometric image;
      for each of the patches in the first and second sets of patches, compute a value of a rotation-invariant feature of the patch;
      determine a plurality of patch match pairings based on values of the rotation-invariant feature, wherein each of the patch match pairings comprises a pairing of a patch in the first set of patches with a patch in the second set of patches;
      determine a transformation operation that aligns a grouping of patches in the first set of patches with a grouping of patches in the second set of patches, wherein the grouping of patches in the first set of patches and the grouping of patches in the second set of patches are selected from the plurality of patch match pairings; and
      perform the transformation operation to align the first biometric image to the second biometric image.

2. The processing system of claim 1, wherein determining the plurality of patch match pairings comprises:
   comparing a value of the rotation invariant feature of a first patch in the first set of patches with a value of the rotation invariant feature of a second patch in the second set of patches;
   determining that a similarity between the value of the rotation invariant feature of the first patch and the value of the rotation invariant feature of the second patch satisfies a threshold; and
   identifying a pairing of the first patch with the second patch as one of the plurality of patch match pairings.

3. The processing system of claim 1, wherein determining the transformation operation comprises:
   computing a translation and rotation that aligns the grouping of patches in the first set of patches with the grouping of patches in the second set of patches when a geometric relationship between patches in the grouping of patches in the first set of patches is preserved.

4. The processing system of claim 1, the processor being further configured to:
   determine an orientation of a given patch in the first set of patches; and
   steer the given patch based on the orientation.

5. The processing system of claim 1, the processor being further configured to:
   determine a dominant direction of a given patch in the first set of patches, wherein the dominant direction corresponds to directionality of multiple ridges in the given patch.

6. The processing system of claim 1, wherein each patch in the first set of patches has a circular shape.

7. The processing system of claim 1, wherein performing the transformation operation includes performing a translation and a rotation.

8. The processing system of claim 1, wherein at least two patches in the first set of patches at least partially overlap one another.

9. The processing system of claim 1, wherein, after the first biometric image is aligned to the second biometric image, the processor is further configured to:
   determine whether the first biometric image is a fingerprint match to the second biometric image.

10. A method comprising:
    determining a first set of patches for a first biometric image, wherein each of the patches in the first set of patches comprises a portion of the first biometric image;
    determining a second set of patches for a second biometric image, wherein each of the patches in the second set of patches comprises a portion of the second biometric image;
    for each of the patches in the first and second sets of patches, computing a value of a rotation-invariant feature of the patch;

determining a plurality of patch match pairings based on values of the rotation-invariant feature, wherein each of the patch match pairings comprises a pairing of a patch in the first set of patches with a patch in the second set of patches;

determining a transformation operation that aligns a grouping of patches in the first set of patches with a grouping of patches in the second set of patches, wherein the grouping of patches in the first set of patches and the grouping of patches in the second set of patches are selected from the plurality of patch match pairings; and performing the transformation operation to align the first biometric image to the second biometric image.

11. The method of claim 10, wherein determining the plurality of patch match pairings comprises:

comparing a value of the rotation invariant feature of a first patch in the first set of patches with a value of the rotation invariant feature of a second patch in the second set of patches;

determining that a similarity between the value of the rotation invariant feature of the first patch and the value of the rotation invariant feature of the second patch satisfies a threshold; and identifying a pairing of the first patch with the second patch as one of the plurality of patch match pairings.

12. The method of claim 10, wherein determining the transformation operation comprises:

computing a translation and rotation that aligns the grouping of patches in the first set of patches with the grouping of patches in the second set of patches when a geometric relationship between patches in the grouping of patches in the first set of patches is preserved.

13. The method of claim 10, further comprising:

determining an orientation of a given patch in the first set of patches; and steering the given patch based on the orientation.

14. The method of claim 10, further comprising:

determining a dominant direction of a given patch in the first set of patches, wherein the dominant direction corresponds to directionality of multiple ridges in the given patch.

15. The method of claim 10, wherein performing the transformation operation includes performing a translation and a rotation.

16. The method of claim 10, wherein at least two patches in the first set of patches at least partially overlap one another.

17. A non-transitory computer-readable storage medium storing instructions that, when executed by a processor, cause a computer system to align a first biometric image to a second biometric image, by performing the steps of:

determine a first set of patches for the first biometric image, wherein each of the patches in the first set of patches comprises a portion of the first biometric image;

determine a second set of patches for the second biometric image, wherein each of the patches in the second set of patches comprises a portion of the second biometric image;

for each of the patches in the first and second sets of patches, compute a value of a rotation-invariant feature of the patch;

determine a plurality of patch match pairings based on values of the rotation-invariant feature, wherein each of the patch match pairings comprises a pairing of a patch in the first set of patches with a patch in the second set of patches;

determine a transformation operation that aligns a grouping of patches in the first set of patches with a grouping of patches in the second set of patches, wherein the grouping of patches in the first set of patches and the grouping of patches in the second set of patches are selected from the plurality of patch match pairings; and perform the transformation operation to align the first biometric image to the second biometric image.

18. The computer-readable storage medium of claim 17, wherein determining the plurality of patch match pairings comprises:

comparing a value of the rotation invariant feature of a first patch in the first set of patches with a value of the rotation invariant feature of a second patch in the second set of patches;

determining that a similarity between the value of the rotation invariant feature of the first patch and the value of the rotation invariant feature of the second patch satisfies a threshold; and identifying a pairing of the first patch with the second patch as one of the plurality of patch match pairings.

19. The computer-readable storage medium of claim 17, wherein determining the transformation operation comprises:

computing a translation and rotation that aligns the grouping of patches in the first set of patches with the grouping of patches in the second set of patches when a geometric relationship between patches in the grouping of patches in the first set of patches is preserved.

20. The computer-readable storage medium of claim 17, wherein executing the instructions further causes the computer system to:

determine an orientation of a given patch in the first set of patches; and steer the given patch based on the orientation.

* * * * *